Feb. 24, 1942.   L. L. HERCIK   2,274,268
APPARATUS FOR CONTROLLING TRAVELING WEBS
Filed May 25, 1940   6 Sheets-Sheet 1

INVENTOR:
LAD L. HERCIK
BY Norman Eisele
ATTORNEY.

Feb. 24, 1942.  L. L. HERCIK  2,274,268
APPARATUS FOR CONTROLLING TRAVELING WEBS
Filed May 25, 1940 6 Sheets-Sheet 2

INVENTOR:
LAD L. HERCIK
BY Herman Eisele
ATTORNEY.

Feb. 24, 1942. L. L. HERCIK 2,274,268
APPARATUS FOR CONTROLLING TRAVELING WEBS
Filed May 25, 1940 6 Sheets-Sheet 3

INVENTOR:
LAD L. HERCIK
BY
ATTORNEY.

Feb. 24, 1942. L. L. HERCIK 2,274,268
APPARATUS FOR CONTROLLING TRAVELING WEBS
Filed May 25, 1940  6 Sheets-Sheet 5

INVENTOR:
LAD L. HERCIK
BY
ATTORNEY.

Patented Feb. 24, 1942

2,274,268

UNITED STATES PATENT OFFICE 2,274,268

APPARATUS FOR CONTROLLING TRAVELING WEBS

Lad L. Hercik, Lakewood, Ohio, assignor to The Hill Acme Company, Cleveland, Ohio, a corporation of Ohio Application May 25, 1940, Serial No. 337,326

16 Claims. (Cl. 271—2.6)

This invention relates generally to the control of traveling webs and particularly to a mechanism for guiding the web in a desired path. This path may be either a predetermined fixed path or a continuously laterally shifting or oscillating path deviating selectively from a normal path by a predetermined amount.

As is well known, many and varying types of traveling webs have been thus controlled including, for instance, power transmitting belts in various types of machinery, traveling Fourdrinier screens in paper making machines, tire fabrics moving into tire making machinery, paper webs in printing machinery, traveling cloth webs feeding into tentering machines, cloth and paper winding machinery and the like.

Likewise various types of instrumentalities have been developed for the purpose of controlling the path of such traveling webs by counteracting or correcting the tendency of the web to deviate from the desired path, these instrumentalities including fingers to mechanically contact the edge of the traveling web and adapted to actuate mechanical corrective devices, electrical current devices adapted to close an electrical circuit to actuate corrective mehanism when the web deviates from the desired path, suction openings adapted to be covered or exposed by the laterally deviating web whereby certain corrective mechanism is actuated to shift the belt, photo electric cells adapted when energized by a beam of light to correctively shift the web, and various combinations of these devices.

This present invention, while it may be adapted to many other uses, is primarily adapted for controlling the path of a rapidly traveling abrasive belt in sheet and strip grinding and/or polishing machinery, for guiding the path of sanding belts in wood working machinery, and for guiding of sheet strip steel webs in rolling mill machinery, and similar installations. It is to be noted that all of the previously known web guiding devices when applied to traveling webs in grinding, sanding or polishing machines or when applied to traveling steel strips have developed certain conspicuous disadvantages either in respect to excessive wear or in respect to failure of operation due to the presence of dirt and foreign matter or in respect to defective operation or excessive maintenance resulting from vibration.

It is accordingly an object of this invention to produce a traveling web controlling means which is particularly well adapted for controlling the path of traveling grinding belts, polishing belts, sanding belts, sheet strips and the like, and which completely eliminates the disadvantages of excessive wear inherent in previously known devices and which does not require frequent renewal of parts in normal operation.

It is a further object of this invention to produce an improved traveling web controlling means which is not affected by dust, grease, dirt, scale, smoke or a gradual accumulation of foreign matter such as is always unavoidably present in grinding, polishing and sanding machinery.

It is a further object of this invention to produce a web controlling mechanism which is not injured or impaired by vibration or by any unusual jar of the machine or which is not seriously damaged by the failure of a belt moving at a high rate of speed adjacent the mechanism.

It is a further object of this invention to produce a web guiding device which does not interfere with the removal of the web from the machine or with the mounting of a new belt on the machine.

It is a further object of this invention to produce a device of this class which does not engage any part of the belt and is therefore not affected by the nature of the surface or edge of the belt and whose accuracy of operation is likewise not affected by the thickness of the belt.

It is a further object of this invention to produce a device of this class which may be easily adjusted to center the path of the web with respect to the edges of the supporting rolls and which is readily adjusted for different widths of webs.

It is a further object of this invention to provide a control mechanism which automatically returns the corrective mechanism to the normal running position as soon as the traveling web has been returned to its normal path.

It is a further object of this invention to produce a guiding mechanism for a traveling web which can readily be alternatively adjusted to guide a web in a fixed path or in an oscillating path.

It is a further object of this invention, when used to guide an oscillating web, to produce a mechanism which can readily be adjusted to control the rapidity and the amplitude of the oscillation.

It is a further and more specific object of this invention to produce a device of this type which may be readily adjusted from one side of the machine and in which the control devices are associated with and actuated only by one edge of the web.

It is a further object of this invention to produce a device of this class which is readily installed on new or existing apparatus, and which is relatively inexpensive to operate.

The above and other objects may be obtained by the elements, constructions and combinations constituting the present invention, a few of the embodiments of which are shown in the accompanying drawings, and which are described in the specifications and hereinafter claimed and which may be stated briefly in general terms to include, in traveling web controlling apparatus, a stream or jet of fluid issuing, under pressure, from a nozzle positioned adjacent the edge of the web and on one side of the plane of the web and directed generally perpendicularly toward the plane of the web, a control device including electrical switch means and having a portion preferably located on the other side of the plane of the web, adapted to be actuated by the impingement or interruption of impingement of the stream or jet, which impingement or interruption of impingement, is caused by the blocking or unblocking of the stream or jet of fluid by a deviation of the web from the normal predetermined path, the switch means being adapted to energize electrical circuits which in turn control mechanism adapted to correctively shift certain web guiding or supporting roller means, whereby the web is returned to its normal path in response to a change in the normal jet action upon the control device caused by the deviation of the edge of the belt from its normal path.

This improved form of traveling web controlling mechanism is disclosed, for purposes of illustration in an application to the control of a flexible abrasive web or belt coated with suitable abrading or polishing material embodied in a sheet strip grinding and polishing machine, and the details of construction and the principles of operation of the novel features of this invention will become apparent from the following detail description and from the annexed drawings which set forth certain means embodying this invention, such disclosed means constituting, however, but a few of the forms in which the principle of this invention may be applied.

Referring to the drawings.

While it will be understood that this invention may be used with many types of equipment, the appended drawings illustrate only one type of apparatus to which this invention may be applied. In these drawings the invention is illustrated as being incorporated in a steel strip grinding and/or polishing machine in which this invention is used for the purpose of guiding a rapidly traveling abrading belt or web in a predetermined path.

General features of machine

Referring first to Figures 1 to 15 of the drawings, the base of the machine is indicated at 1, upon which is mounted a pedestal 2 at the upper end of which is mounted a billy roll 3. This billy roll may be adjustably mounted both vertically and horizontally by means not shown, as such means form no part of this invention.

Longitudinally spaced from the pedestal 2 are, in the embodiment illustrated, a pair of brackets 4 adapted to support strip deflection rolls 5. These deflection rolls are mounted in bearings 6 which are preferably vertically adjustable. A strip to be finished in this machine is indicated at 7 and passes over the billy roll 3 and under the deflection rolls 5. This strip may be of any desired width and is frequently known as a strip sheet and may consist of steel, stainless steel, Monel metal, bronze, zinc or other metallic or nonmetallic materials, which is to be ground, polished, satin finished or buffed on this machine.

This strip is fed over the billy roll 3 and deflection rolls 5 usually under tension which is applied by certain well known feeding and tensioning devices, not shown, and is flexed convexly about the billy roll in order that the upper surface of the strip may be most effectively positioned at this point for finishing. This strip may travel continuously in one direction or its direction of travel may be alternatively reversed.

Also mounted on the base 1 is the main frame 8 of this grinding machine which supports a horizontally adjustable drive frame 9 and a vertically adjustable head frame 10.

Mounted on the drive frame 9 is a driving motor 11 equipped with a motor pulley 12 upon which is mounted a driving belt 13. This belt, in turn, drives a pulley 14 mounted on a shaft 15 which is supported on the adjustable drive frame 9. Also mounted upon the drive shaft 15 is a roll 16 which drives a rapidly traveling abrading web or belt 17. This web or belt 17 is a flexible endless element coated with abrading or polishing material suitable for producing the type of finish desired on the strip 7. This abrading belt 17 is supported by a contact roll 18 which may be formed of relatively elastic material and which serves to press the abrading belt into suitable abrading engagement with the upper surface of the strip 7 on the billy roll 3. This contact roll 18 is suitably supported at the lower end of the head frame 10. The abrading belt 17 also passes over an upper head roll 19 likewise suitably supported in the head frame preferably at the upper end and in fixed spaced relation with the contact roll 18. The abrading belt also passes over a guide roll 20 which deflects the belt slightly upwardly from the plane defined by the upper surfaces of the rolls 16 and 19. This guide roll 20 is so designated because it performs the function of guiding the abrading web or belt in a predetermined path for which purpose it is provided with suitable supports and with suitable control mechanism to be hereinafter described. The lineal tension of the web 17 is controlled by means of an adjustment suggested at 9a, of the drive frame 9 upon which the web drive roll 16 is mounted. These rolls 16, 18, 19 and 20, for supporting and advancing the web 17, are preferably formed with straight or substantially straight faces, and the axes of these rolls are normally parallel to each other.

For purposes of controlling the intensity of pressure exerted by the contact roller 18 upon the strip 7, suitable counterweighting and pressure applying devices are associated with the head frame. This apparatus comprises a link 21 pivotally connected at its lower end to a portion of the head frame and connected at its upper end to a substantially horizontally disposed lever 22 which in turn is pivotally supported on the main frame at 23. Adjustably mounted on the lever 22 is a counterweight 24 which is located on the lever to slightly more than counterbalance the weight of the head frame 10 and the parts supported by the head frame, so that the head frame is normally lifted upwardly whereby the abrading belt is normally maintained out of contact with the strip 7.

Pivotally connected to the main frame at 25 and to the lever at 26 is a preferably pneumatically controlled diaphragm apparatus 27 which is adapted when actuated to counteract the gravitational lifting effect of the counterweight 24 and is adapted to force the head frame 10 and hence the contact roll 18 and the belt 17 against the upper surface of the strip, the intensity of pressure with which the contact roll is forced against the strip being proportionate to the intensity of pneumatic pressure applied to the diaphragm.

Guide roll

Figure 6:
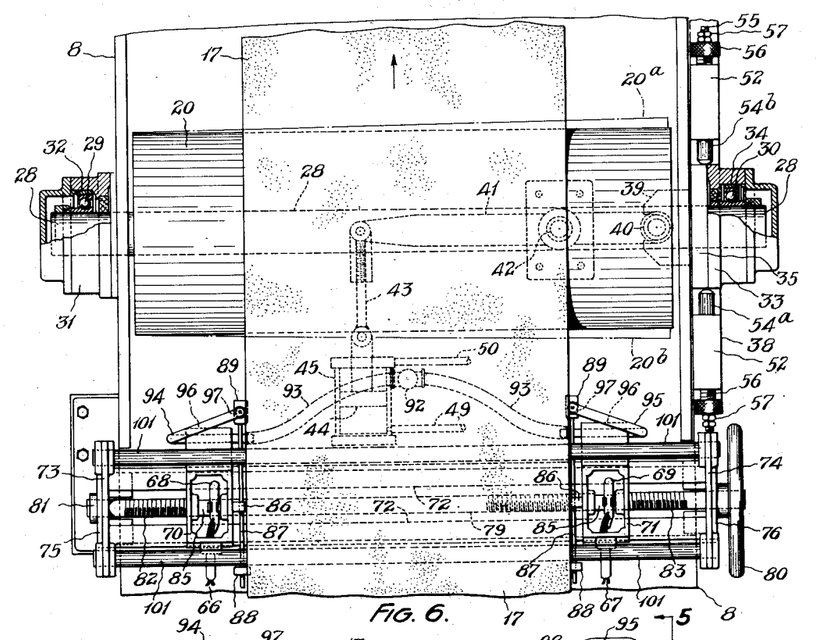
Fig. 6 is a plan view of a portion of the machine illustrated in Fig. 1, this view being taken on the plane indicated by line 6, 6, in Fig. 3.
Figure 8:
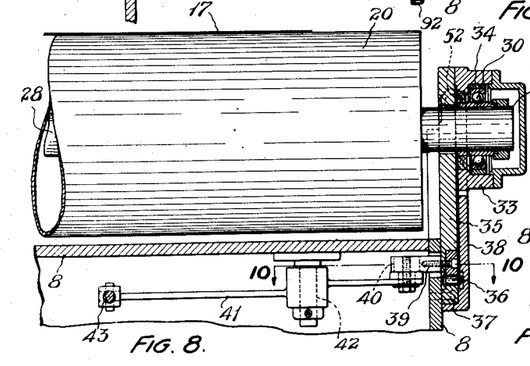
Fig. 8 is a fragmentary transverse section showing a certain corrective web guide roll and its mounting, this section being taken on the plane indicated by line 8, 8 in Fig. 3.

The guide roll 20, as is best illustrated in Figures 6 and 8, is of hollow construction and is formed of relatively light material supported on a shaft 28 which is in turn supported by annular ball bearings 29 and 30, Fig. 6. These bearings 29 and 30 are of the type known as self aligning, which permit a considerable tilting of the axis of the shaft with respect to the support or mounting of the outer race of the ball bearing. When the abrading web is under tension sufficient pressure is created against this roll 20 by the deflected belt to cause the roll to rotate. The axis of the roll 20 being normally substantially parallel with the axes of the drive roll 16, contact roll 18 and upper head roll 19, the roll 20 will not normally interfere with the traveling of the abrading web in the desired predetermined path. It will also be evident that the intensity of pressure caused by the engagement of the roll 20 with the web 17 is sufficient, if the roll is tilted to a position slightly out of parallelism with the rolls 16, 18 and 19 to cause the web to guide or shift laterally progressively from the path in which it traveled prior to the tilting. It will further be evident, therefore, that if provisions are made to tilt the axis of the roll 20, this roll will serve to guide or shift the path of the web laterally, in a direction dependent upon the direction of tilt of the roll 20. It will also follow that this guide roll 20 may thus be used to correct and counteract any lateral deviation of the web from the normal or desired predetermined path and to guide the web back toward the predetermined path, and this guide roll 20 may accordingly be designated as a corrective roll.

*Guide roll support and tilting mechanism*

The construction of the support of the guide roll 20 which makes possible the tilting of the guide roll 20 with respect to the other web supporting rolls and the mechanism for effecting the tilting of the guide roll now will be described. The guide roll supporting shaft 28 is pivotally supported at one end, the left end as shown in Fig. 6 and is slidably supported at the other end, the right end, as shown in this figure. The support for the pivoted end of the shaft consists of a bearing housing 31 fixedly mounted on the main frame 8 which is provided with a ring 32 formed with a spherical seat for the outer race of the ball bearing 29, suitable collars being provided to axially lock the inner race of the ball bearing to the shaft 28 and suitable protective seals being provided to protect the bearing against scale, dirt and grit.

The support for the slidable end of the shaft 28 consists of a bearing housing 33 best shown in Figures 3, 6, 8, 9, and 10, which is provided with a ring 34 formed with a spherical seat to receive the outer race of the ball bearing 30. Suitable collars are provided to lock the inner race of the ball bearing 30 to the shaft 28. The ring 34, as will appear from an inspection of Figures 6 and 8, is free to slide axially in the housing to compensate for the slight arcuate movement of the sliding end of the shaft bearing 30. The housing 33 is secured in any desired manner to a bearing plate 35 which is in turn supported on a roller structure indicated at 36, Figures 3, 8, and 9, and supported on a substantially horizontal race 37, secured to the frame 8. A cover and guide plate 38 is adapted, together with the face of the adjacent portion of the frame, to form guideways for suitably supporting and guiding the housing 33 and its associated supporting structure. The housing 33 is thus adapted to be shifted parallel to the direction of travel of the web 17, that is transversely with respect to the axis of the shaft 28.

Figures 9, 10:
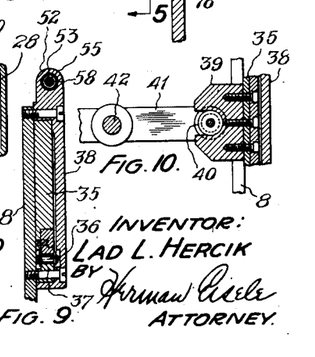
Fig. 9 is another fragmentary transverse section thru another portion of the mounting for the corrective web guide roll, this section being taken on the plane indicated by line 9, 9 in Fig. 3.
Fig 10 is a fragmentary plan section showing the connection between bearing for the corrective roller and certain bearing shifting mechanism, this view being taken on the plane indicated by line 10, 10 in Fig. 8.

Adjacent to the lower end of the bearing plate 35 and preferably to its inner face is fixedly secured a bracket 39 formed with a slot in which is seated a roller 40 mounted on a lever 41 preferably extending inwardly toward the center of the machine and normally substantially parallel to the axis of the guide roll 20, as best shown in Figures 6, 8, and 10. The lever 41 is pivotally mounted on a pin 42 fixedly secured to the main frame 8. Connected to the inner end of the lever 41 is a link 43 adjustable in length, the other end of the link being pivotally connected to the rod of a piston 44 of a fluid actuated cylinder 45, Figures 2, 3, and 6. This cylinder is actuated preferably by compressed air and is controlled by suitable valve mechanism controlling the passage of the air from a suitable source of air under pressure as will be described.

Figure 2:
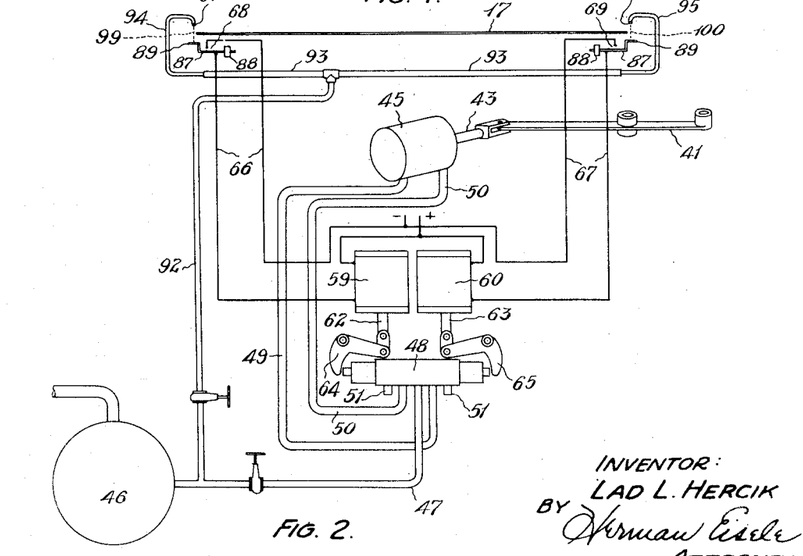
Fig. 2 is a diagrammatic view illustrating, detached from the machine, certain essential elements of this improved web controlling apparatus in relation to each other and in relation to the traveling web.

Referring to Fig. 2, a pressure of air storage tank is diagrammatically shown at 46 from which a suitable air supply line or air inlet line 47 leads to the four way solenoid actuated air valve 48. From this air valve a line 49 leads to the head end of the cylinder 45 and a corresponding line 50 leads to the piston rod end of the cylinder. Suitable air exhaust openings 51, 51 are provided in the air valve 48 to permit the air behind the piston to escape when the piston is being reversed. This air valve may be of any well known standard design and since this valve per se forms no part of this invention it need not be described in detail.

Figure 3:
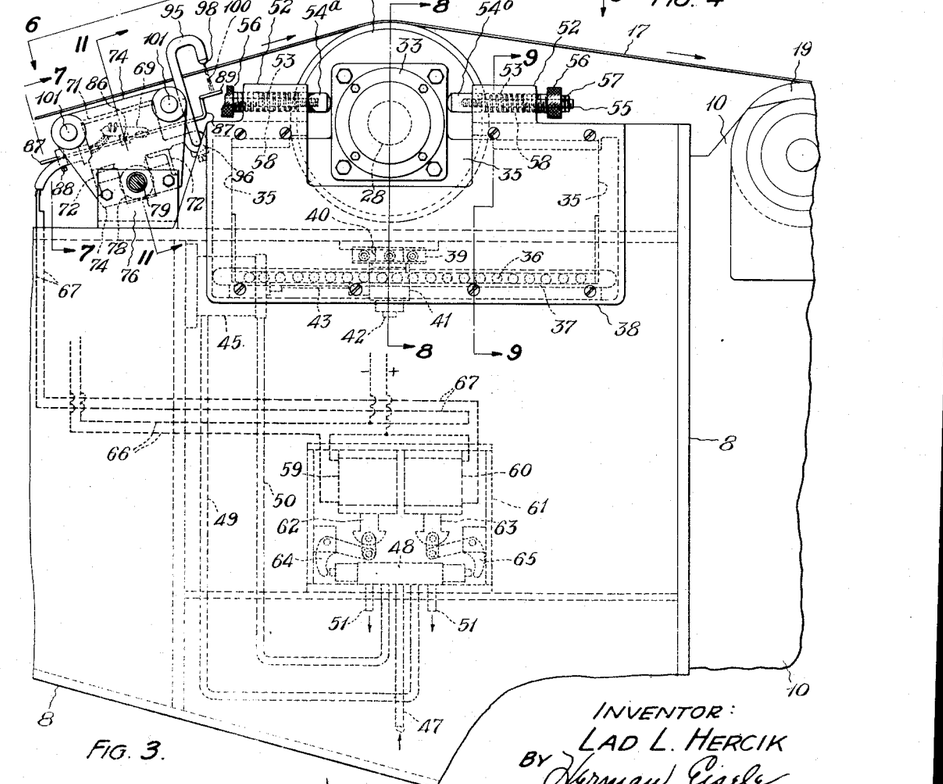
Fig. 3 is an enlarged elevational view of that portion of the grinding and polishing machine shown in Fig. 1 with which this improved web controlling apparatus is associated, certain elements of this apparatus normally disposed within the housing of the machine being shown in dotted lines.
Figure 15:
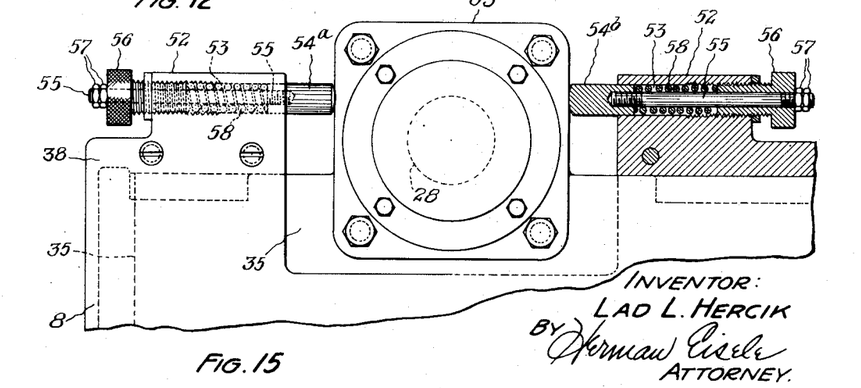
Fig. 15 is an enlarged side elevational view of the upper portion of the corrective guide roll bearing, this view being partly shown in section to better illustrate certain spring propelled resetting mechanism.

The axis of the guide roll 20 is normally positioned parallel to the axes of the other belt supporting rolls as shown in Figures 3, 6, and 15. It will be evident that if the air valve 48 is suitably actuated the piston 44 in the cylinder 45 will cause the axis of the guide roll 20 to be tilted or deflected with respect to the axes of the other web supporting rolls, 16, 18 and 19, the direction of the tilt depending, of course, on the direction of movement of the piston 44.

It will also be evident that the frictional engagement of the web with the top of the guide roll will cause the web to deviate laterally progressively from its median or normal path when the piston tilts the cylinder and it is also evident that the rapidity of this progressive lateral deviation will be proportionate to the amount of deflection of the axis of the guide roll out of parallelism with the other rolls.

*Means for re-setting guide rolls*

Means are provided for automatically re-setting or returning the axis of the guide roll to the original position with respect to the other rolls after the deviation of the traveling web from its normal path has been corrected.

As will best appear from Figures 3, 9, and 15, elongated bosses 52 are formed on the cover 38 on opposite sides of the slidable bearing housing 33. These bosses are formed with bores 53 in which are slidably mounted plungers or abutments 54a and 54b which serve to locate the bearing 33 and hence the axis of the shaft 28 of the roll 20. Secured to the plungers 54a and 54b and extending rearwardly thru the bores 53 are plunger extension rods 55 of smaller diameter than the plungers, these rods passing thru and being slidably supported by threaded adjustable screw plugs 56 beyond which the rods 55 extend. Interposed between the inner ends of the plungers 54a and 54b and the plugs 56 and preferably surrounding the extension rods 55 are compression springs 58. Nuts 57 are provided on those portions of the rods 55 extending beyond the adjustable plungers for the purpose of properly tensioning the springs 58 between the plunger heads and the screw plugs.

Figure 4:
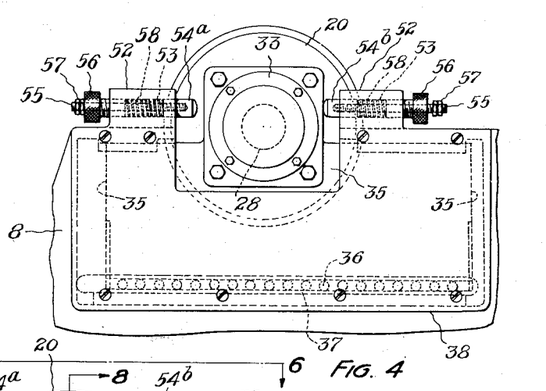
Fig. 4 is a view of the upper central portion of the parts shown in Fig. 3 showing, however, a certain guide roll supporting bearing in a shifted position.
Figure 5:
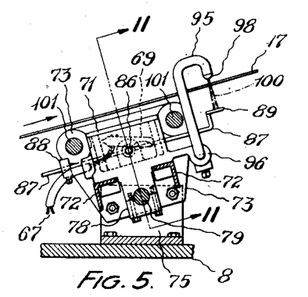
Fig. 5 is a fragmentary longitudinal section to more clearly illustrate certain elements which are shown in dotted lines in Fig. 3, this view being taken on the plane indicated by line 5, 5, in Fig. 7.

It will appear from Fig. 15 that when the shiftable end of the shaft 28 and hence the housing 33 is shifted in one direction or the other, the corresponding plunger 54a or 54b will be pressed into its bore 53, this position being shown for instance in Fig. 4 in which the bearing housing 33 and the bearing plate 35 are shown shifted to the right, pressing the plunger 54b into its bore, this shifting being effected by means of the bracket 39, lever 41 and associated mechanism actuated by pressure imposed on the piston rod end of the piston, as will be understood from an inspection of Fig. 6. This shifting of the housing 33 imposes a tension upon the spring 58 in addition to that imposed by the nuts 57. As soon as the air pressure is released against the piston 44 by the air valve 48, the compressed spring expands and forces the housing back into its normal position. It will also be evident that if pressure is imposed upon the head end of the piston 44 by the air valve 48, the housing 33 and bearing plates 35 will be shifted to the left as viewed in Fig. 4 and upon the release of pressure on the head end of the piston this bearing housing will again be returned to the normal position. These spring pressed plungers and associated mechanism accordingly comprise resilient means adapted to automatically return the guide roll to its normal position.

As will be noted the adjustable nuts 57 engaging the outer faces of the plugs 56 limit the distance which the associated plungers 54a and 54b may move the bearing housing. These threaded plugs 56 are also normally so adjusted that the two spring pressed plungers 54a and 54b will firmly hold the housing in the desired fixed position to maintain the shaft 28 in a position in which the guide roll will cause the web 17 to travel in the desired predetermined path. These plugs are preferably so adjusted that the plungers just contact the sides of the housing 33, there being substantially no spring actuated pressure against the housing and there being no loose play between the ends of the plungers and the bearing when the nuts 57 are in engagement with the outer surfaces of the plugs 56.

The adjustable mounting of the nuts 57 on the extension 55 makes possible the adjusting of the tension on the springs in order that this tension may be sufficient to prevent any uncontrolled shifting of the bearing housing 33. It will also be apparent that the adjustment of the plugs 56 in the bores 53 may be utilized to shift the normal position of the shiftable end of the shaft 28 by adjusting one plug inwardly toward the shaft and backing the other plug from the shaft, this provision being utilized in making the original setting of the shaft 28 and guide roll 20 to effect the proper desired normal tracking of the belt on the pulleys. This mechanism may accordingly be designated as screw means to adjust the axis of the guide roll to cause the web to travel in the desired path.

*Control of guide roll tilting mechanism*

The control device for actuating the mechanism for shifting the axis of the guide roll 20 will now be described.

Referring first to Figures 2 and 3, electrically energizable solenoids are shown at 59 and 60, these solenoids being mounted in a casing 61 which likewise supports the four way air valve 48. Each solenoid 59 and 60 is provided with a vertically movable plunger indicated at 62 and 63 respectively.

Also suitably supported in the casing 61 are a pair of bell crank levers 64 and 65 each associated with one of the solenoids and adapted to actuate the four way valve 48 to introduce air under pressure into one or the other end of the supply lines running to the cylinder 45. As shown in the drawings, the solenoid 60 when energized is adapted to actuate the valve 48 to introduce air under pressure thru the line 50 into the piston rod end of the cylinder 45 and the solenoid 59 when energized is adapted to introduce air under pressure thru the line 49 into the head end of the cylinder.

*Control device for tilting mechanism*

Figure 7:
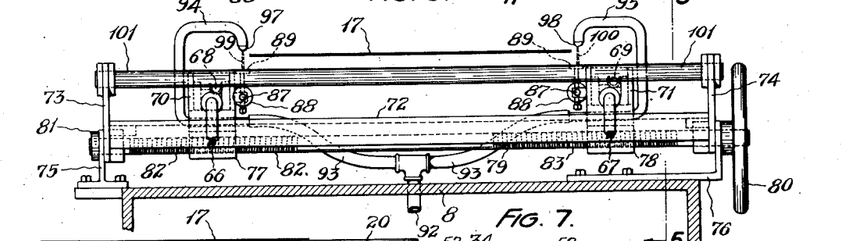
Fig. 7 is a transverse section of the machine to more clearly illustrate certain transverse adjusting mechanism, this view being taken on the plane indicated by line 7, 7 in Fig. 3.

The solenoids 59 and 60 may be actuated by circuits indicated at 66 and 67 supplied with electric current from any suitable source, each circuit being controlled by a control device including a mercury switch, the switch for closing the circuit 66 to the solenoid 59 being indicated at 68 in Figures 6 and 7, and the mercury switch for closing the circuit 67 to the solenoid 60 being indicated at 69 in the same figures. The mercury switch 68 is supported in a suitable casing 70 and the mercury switch 69 is mounted in a similar casing 71. These mercury switch casings are supported for adjustment in a direction transverse of the direction of travel of the web 17 upon a pair of spaced angles 72, 72, these angles being secured upon suitable end brackets 73 and 74 which are mounted in any desired manner on support members 75 and 76 which are in turn mounted on the frame 8 of the machine. The casings 70 and 71 are formed with downwardly extending projections 77 and 78 respectively which have screw threaded engagement with a screw member 79 supported by and extending beyond the end brackets 73, 74 and rotatably supported by members 75, 76. At a point beyond the support member 76 a hand wheel 80 is fixedly mounted on the screw 79 and a suitable thrust collar 81 is mounted on the shaft exteriorly adjacent the support member 75 whereby the screw 79 is axially fixed. The screw 79 is formed with a left hand thread as shown at 82 upon that portion which engages the projection 77 and is formed with a right hand thread as shown at 83 at that portion of the screw which engages the projection 78. It will accordingly be evident that a clockwise rotation of the hand wheel 80 as viewed in Fig. 1 will cause the casings to separate, thereby increasing the space between the casings and a counterclockwise rotation of the handwheel will cause the casings to approach each other, that is, to reduce the intervening space between the casings. The casings are formed with seats snugly slidably mounted between the transverse angles 72 and the screw 79 serves to maintain these casings seated upon and between the angles 72. The downwardly extending projections 77 and 78 each include a cap secured by screws to the projection and forming in part the threaded bore engaging the screw member 79. It will be apparent that the casings may be individually transversely shifted with respect to the screw and the frame 8 of the machine by lowering the cap and raising the casing sufficiently to permit the temporary disengagement of the threads.

Figures 11, 14:
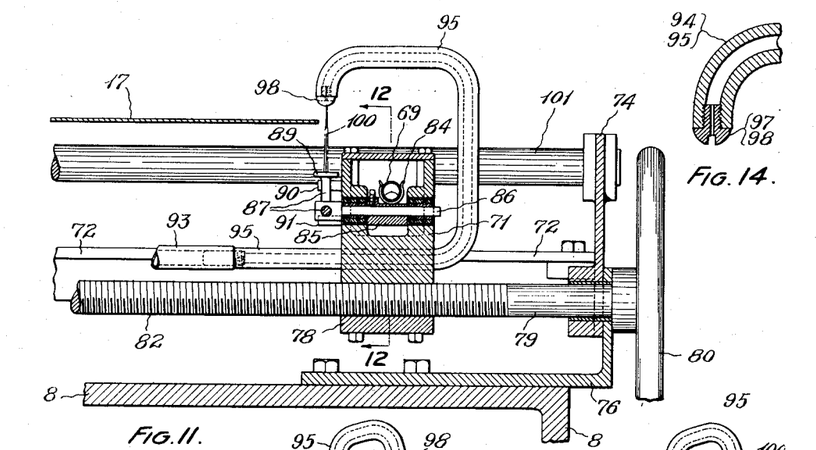
Fig. 11 is a still further enlarged sectional view showing the details of a certain control device directly associated with a certain air jet nozzle, this view being taken on the plane indicated by line 11, 11 in Figures 3, 5, and 12.
Fig. 14 is a fragmentary sectional view thru the tip of the air jet nozzle.
Figures 12, 13:
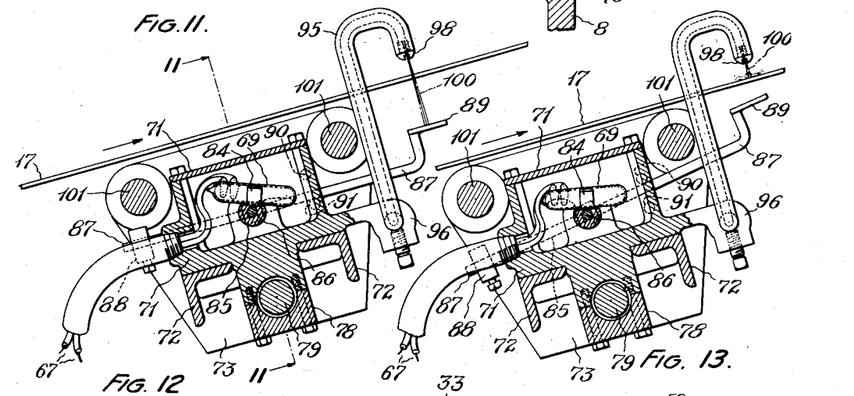
Fig. 12 is a fragmentary longitudinal sectional view showing a control device including an air jet nozzle and certain electrical switch means associated therewith, a portion of this view being broken away on the plane indicated by line 12, 12 in Fig. 11, this view showing the position of the switch means when the air jet is impinging against a portion of a certain switch control lever.
Fig. 13 is a view similar to Fig. 12 showing, however, the parts of the electrical switch means and control lever in the position which they occupy when the impingement of the air jet against the control lever is interrupted by the web.

The mercury switches 68 and 69 in the control devices are each preferably formed with two spaced contacts located at one end of the enclosed glass tube, as best shown in Figures 12 and 13, these contacts maintaining the circuit open when the mercury tube is tilted to position the mercury in that end of the tube opposite to the contacts, as shown for instance in Fig. 12 and adapted to close the circuit when the tube is tilted to position the mercury so that it engages both contacts, as shown for instance in Fig. 13. These mercury tubes, as best illustrated in detail in Figures 11, 12 and 13, are each mounted in a spring clip 84 secured to a collar 85. The collar is secured to a light shaft 86 which is mounted in antifriction bearings supported in the casings 70 and 71. The shaft 86 of each control device extends outwardly beyond the edge of its casing and preferably in a direction toward the center of the machine. Upon this extension of the shaft 86 in each device is mounted a light control lever 87 secured to the shaft, a counterweight 88 being mounted on this lever adjacent one end, as best shown in Figures 12 and 13 and the other end of the lever 87 is formed with a relatively thin, flat plate, wing or spoon 89 adapted to serve as an abutment for a jet of air presently to be referred to. The levers are mounted for oscillatory movement in a vertical direction, this movement being limited, however, by a pair of pins mounted in the casings 70 and 71, see Figures 11 to 13, the upper stop pin being indicated at 90 and the lower stop pin being indicated at 91. The counterweighting of the lever is so adjusted that, in the absence of the application of any external force, the lever occupies a position abutting the upper stop pin 90, this position being shown in Fig. 13.

Referring now to Fig. 2, it will be apparent that an air pressure line 92 branches off from the supply line 47 leading into a substantially horizontally disposed preferably flexible distributing line 93. Connected with each end of this distributing line are nozzle tubes 94 and 95 respectively, as best shown in Figures 6 and 7, these tubes being angularly and axially adjustably supported in a bore of a boss 96 formed on the casings 70 and 71 and secured for transverse adjustment therewith by means of a set screw. As will best appear from Figures 7, 11 and 12, the delivery tubes are bent upwardly from the base 96, then transversely and then downwardly and are provided at their downwardly projecting terminals with nozzles in the form of nozzle tips 97 and 98, formed of screw threaded removable elements having a relatively small axial perforation, see Fig. 14. When air under pressure is delivered to these nozzles, relatively fine jets of air indicated at 99 and 100 issue from these nozzles. These nozzles may accordingly be said to constitute a source of kinetic pneumatic energy. It will be seen that these jets issue from the nozzles in a direction toward the web and substantially perpendicular to the plane of the web. It will be apparent from Figures 2, 6, 7, and 11 that the nozzle tips are aligned with the spoons or plates 89 on the levers 87 and that the jets 97 and 98 are adapted to impinge directly against the spoons. It is also to be noted that the impinging of the jets against the spoons 89 causes the lever 87 to tilt downwardly against the stop pin 91 and the lever 87 and associated mercury switch may accordingly be said to constitute a pneumatic or fluid jet responsive device. It will be noted that both the nozzle and the spoon or jet responsive device are spaced from the plane of the web. It will also be apparent from Figures 2, 7, and 11 that the jet is disposed outwardly of but adjacent the lateral edges of the traveling web 17 in the position of the parts as shown in these figures, and it will also appear that these jets are capable of being intersected by the web if the web deviates laterally from the normal path.

Located above the control device casings are a pair of bars or rods 101 extending transversely between the brackets 73 and 74, these bars being provided to protect the delicate switch and lever mechanism against serious damage in the event that the rapidly traveling abrading belt breaks.

Operation

Figures 1, 2, 3, 5 to 12 and 15 show the parts in the position which they assume when the web is running in the desired predetermined path. In this position the jets of air 99 and 100 issue from the nozzle tips 97 and 98, clearing the edge of the belt and impinging directly upon the spoons 89 of the counterweighted control levers 87, the force of this jet being sufficient to overcome the effect of the counterweight 88 and causing the lever to rest against the lower stop pin 91, as will appear from an inspection of Fig. 12.

Figure 1:
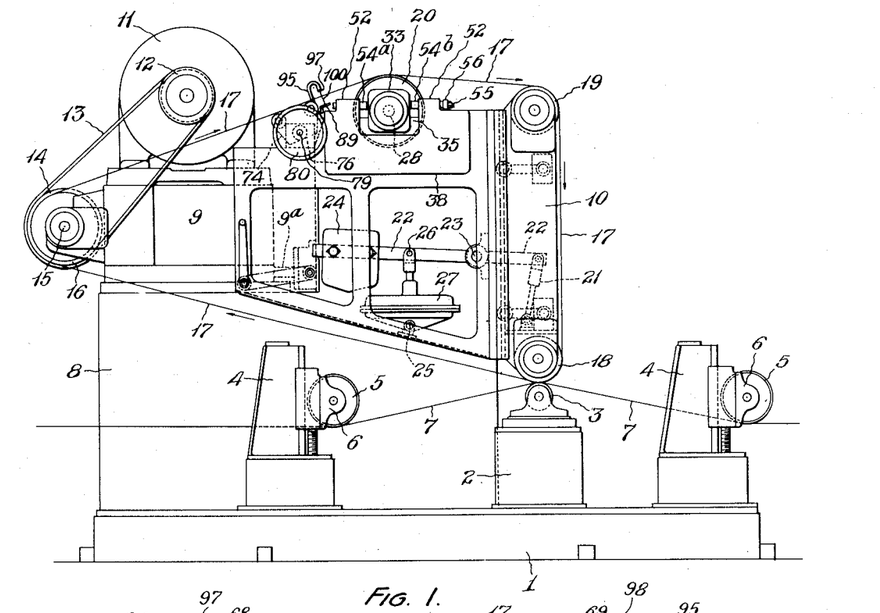
Fig. 1 is an elevation of a strip sheet grinding and polishing machine in which this improved web controlling apparatus is embodied for the purpose of controlling the path of the abrading web or belt.

The control lever 87 and the mercury switches 68 and 69 are mounted in such angular relation on the shafts 86 that, when the jets force the spoon end of the levers downwardly, the tubes are tilted downwardly to move the mercury away from the contacts, thus maintaining the circuits 66 and 67 open, and thus de-energizing both of the solenoids 59 and 60. Under this circumstance the four way valve 48 automatically releases the pressure from both ends of the cylinder 45 and the spring controlled plungers 54a, 54b maintain the guide roll shaft 28 in the normal position, which tends to maintain the web traveling in the desired predetermined path, these spring controlled plungers likewise causing the piston 44 to assume an intermediate position between the ends of the cylinder, as previously explained. As is well known, however, it is extremely difficult to maintain a web traveling in a fixed path when the web is traveling on straight or substantially straight rolls. As pointed out, this improved device is intended to return the belt to its normal path of travel in the event that the web has meandered, for any reason from the predetermined path, and this is effected as follows:

Suppose it be assumed that the belt shifts to the right as shown in Figures 2, 6, 7 and 11. In this event the edge of the web will approach the jet 100 issuing from the nozzle 98 and will eventually intersect the path of the jet 100 and will interrupt or block this jet from reaching the spoon 89 on the control lever 87. In this event, the downwardly directed force of the jet having been removed from the spoon 89, the counterweight 88 causes the lever 87 to tilt upwardly against the upper stop pin 90 and assume the position illustrated in Fig. 13. It will be apparent from this figure that this upward tilting of the lever 87 has caused the mercury in tube 69 to travel downwardly toward the spaced contacts thus causing the mercury to close the electrical circuit 67 controlled by this switch 69. The closing of this circuit automatically energizes the solenoid 60 which lifts the plunger 63 this in turn tilting the bell crank lever 65 to so actuate the valve 48 to introduce air thru the line 50 into the piston rod end of the cylinder 45. This air pressure causes the piston to move toward the head end of the cylinder causing the lever 41 to tilt in a counterclockwise direction as viewed in plan in Fig. 6 and causing the bearing housing 33 and hence the shiftable end of the shaft 28 to move upwardly as indicated in plan in Fig. 6 or to the right as indicated in Figures 1 and 3, these parts then occupying the position illustrated in Fig. 4 thus tilting the roll 20 to the position suggested in broken lines at 20a, in Fig. 6. This tilting of the roll 20, as will readily be understood, will cause the web to progressively travel to the left as viewed in Figures 6 and 7.

After the web has traveled laterally a sufficient distance to reach its normal predetermined path, the jet 100 issuing from the nozzle 98 will be unblocked and the jet will again be free to impinge against the spoon 89 on the lever 87 which, in turn, will cause the lever to tilt back into the position shown in Fig. 12 causing the circuit 67 to open and causing the magnet 60 to become de-energized whereupon the plunger 63 drops to permit the valve 48 to shift to a neutral position in which the air is released from both sides of the cylinder. The pressure against the piston having been released, the spring pressed plunger 54b will again return the housing 33 and hence the shaft 28 to its normal running position and the guide roll will be so positioned that the belt will continue to travel in the desired predetermined path. It is to be noted that the plunger 54b does not tilt the guide or correcting roll 20 beyond the position in which it would normally operate the belt in the desired path.

If the belt should travel to the left as viewed in Figures 6 and 7, it will intersect the path of the jet 99 issuing from the nozzle 97, and the jet will be intercepted or blocked from reaching the spoon 89 associated with the nozzle 97, thus permitting the associated lever 87 to tilt clockwise, as viewed from the left side of the machine (Figures 6 and 7), which in turn causes the mercury switch 68 to close the circuit 66 thus energizing the solenoid 59 and causing the plunger 62 and associated bell crank 64 to actuate the valve 48 to introduce air under pressure thru the line 49 into the head end of the cylinder 45 which causes the lever 41 to move clockwise as viewed in Fig. 6 thus shifting the shiftable end of the shaft 28 downwardly toward the observer, as viewed in Fig. 6, or to the left as viewed in Figures 1 and 3. This actuation of the shifting mechanism causes the guide roll 20 to tilt in a direction suggested by the broken line 20b, Fig. 6, which in turn causes the belt to travel to the right, this tilted position of the guide roll being maintained until the belt has reached its predetermined path at which time the jet 99 issuing from the nozzle 97 is unblocked and causes the associated lever 87 and switch 68 to open the circuit 66 and de-energize its solenoid 59, whereupon the spring pressed plunger 54a again returns the guide roll to its predetermined normal running position.

From the above description it will appear that the counterweights 88 on the control levers 87 normally constrain the control device to close the circuit to actuate the corrective web shifting mechanism and that the jets 99 and 100 restrain the counterweights from functioning. It also follows from the above that the energy is variously transmitted from the source to the control device in accordance with the lateral deviations of the web, or that the jet or stream of air will variously actuate the control device in accordance with the lateral deviations of the web.

*General*

It will be evident that the herein disclosed apparatus is particularly well adapted for controlling the path of rapidly traveling grinding belts, polishing belts, sanding belts, sheet strips and the like and that the operation of this apparatus is not affected by vibration, dust, grease, scale dirt or other foreign matter, and that this apparatus is not subject to excessive wear and does not require frequent replacement of parts and that this apparatus otherwise fulfills the objects of this invention set forth at the beginning of this specification.

*Arrangement for oscillating web*

The herein disclosed apparatus is adapted not only to maintain the path of a traveling web within narrow limits of deviation from a predetermined path, but this apparatus may also be arranged or adjusted to positively cause the web to alternatively shift or deviate laterally in opposite directions from a median path. Such a regular and controlled oscillation is sometimes desirable, for instance, in case the controlled web is a grinding or polishing belt in which a slight lateral deviation is advantageous in order to produce a more uniformly ground or polished surface. This lateral oscillatory movement of the web is effected by a suitable adjustment of the previously described control devices and guide roll actuating mechanism.

Figure 16:
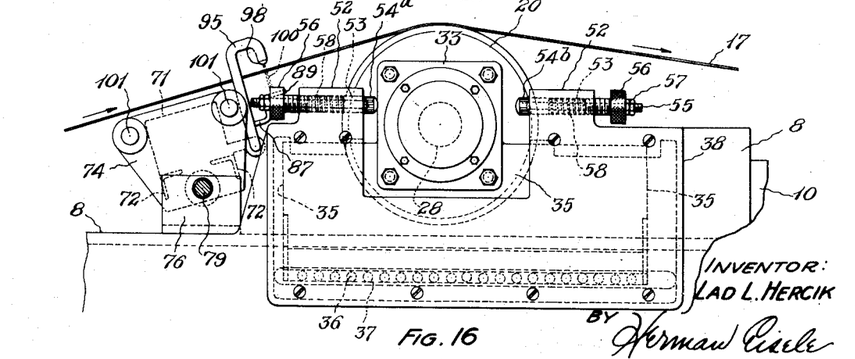
Fig. 16 is a view similar to a fragmentary portion of Fig. 3, showing the web controlling mechanism adjusted to produce a shifting or oscillatory path of the traveling web.
Figure 17:
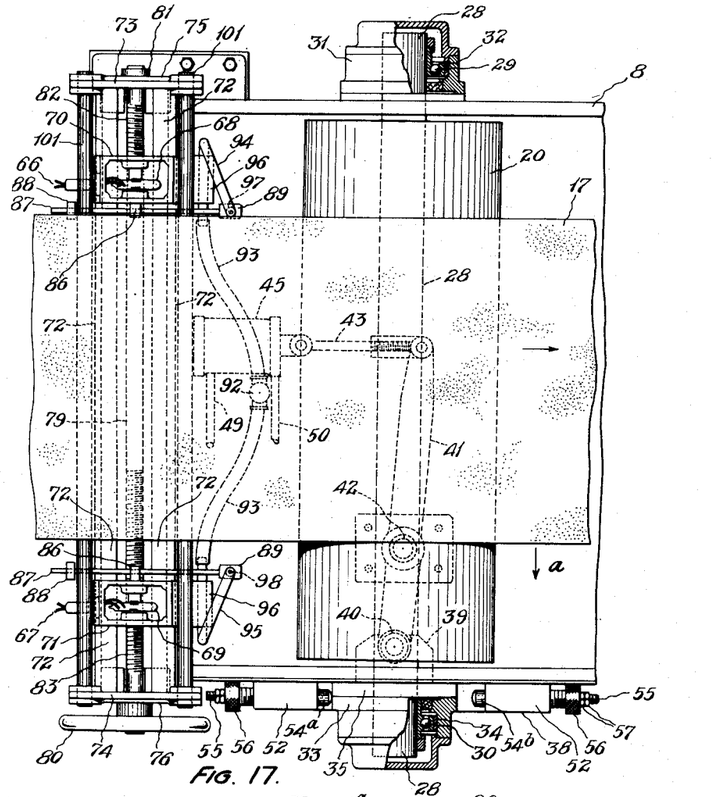
Fig. 17 is a fragmentary plan view similar to Fig. 6 showing, however, the parts in the position corresponding to Fig. 17 set for oscillatory travel of the traveling web.

One arrangement of these control devices to produce lateral oscillation of the web is illustrated in Figures 16 and 17. In these figures the elements of the control devices and the elements of the guide roll actuating mechanism are identical with the control devices and roll actuating mechanism previously described, and the construction and operation of these devices and mechanism need not be described in detail, and for purposes of identification of the several parts the same reference characters are applied to the same parts as in the previously described views.

As will appear from an inspection of Figures 16 and 17, altho the width of the web 17 is substantially identical with the width of the web illustrated in Fig. 6, the control devices including the nozzles 97, 98 control levers 87, 87, switches 68, 69, casings 70, 71 and associate parts are spaced farther apart in Fig. 17 than in Fig. 6. In the absence of any other control arrangement than that previously described, this wider adjustment of the control devices would only permit the web to meander a greater distance from a predetermined or median path before any corrective action is applied to the path of the web.

It will be noted, however, by comparison with Fig. 3, that the plungers 54a and 54b as shown in Fig. 16 have been so adjusted that they are spaced farther apart and no longer return the shiftable bearing housing 33 to a medium position after the housing has been laterally shifted responsive to the corrective control devices and associated mechanism. It is to be understood from this that the piston 44 and associated mechanism when actuated by the one or other control device shifts the housing 33 sufficiently to compress the plunger springs 58 as pointed out in connection with the description of the operation of the previously described arrangement, but the springs are stopped from returning the housing 33 to the central position. This is effected by withdrawing the threaded adjustable screw plugs 56 slightly from the bores 53, thus positioning the plungers 54a and 54b and associated mechanism farther from the housing 33. As a result of this adjustment when the housing 33 is shifted by the piston 44 and associated shifting mechanism, the plungers do not return the housing 33 and the shaft 28 of the guide roll 20 to a position parallel with the other rolls but place this guide roll slightly short of a position of parallelism, when the pneumatic pressure on the piston is released, as shown for instance in Figures 16 and 17, where the housing 33 is positioned to the left of the median position shown for instance in Fig. 3 as a result of which the shaft 28 and roll 20 are tilted to tend to feed the web toward the observer as viewed in Fig. 16, and as indicated by the arrow a in Fig. 17.

As will be understood, this setting of the guide roll axis will cause the web 17 to progressively travel toward the observer, that is from the nozzle 97 to the nozzle 98, and as will be evident from the preceding description the web will continue to thus deviate laterally from the normal path until the near edge of the web intercepts or blocks the jet of air 100 issuing from the nozzle 98, at which time the mercury switch 69 will actuate the mechanism including the piston 44 and lever 41 to shift the housing 33 to the right as viewed in Figures 16 and 17 to compress the spring 58 associated with the plunger 54b, thus tilting the shaft 28 and roll 20 to cause the web to travel from the nozzle 98 toward the nozzle 97. When the path of the web has shifted sufficiently in this direction the web will unblock the jet 100 issuing from the nozzle 98 and the pressure will be released from the cylinder permitting the spring 58 to automatically actuate the plunger 54b to shift the housing 33 slightly toward its preceding position but short of a position parallel with the axes of the other web supporting rolls, as a result of which the web will continue to travel toward the nozzle 97 until the far edge of the web intersects or blocks the jet 99 issuing from the nozzle 97, whereupon the control device associated with nozzle 97 actuates the shifting mechanism to place the guide roll again into position in which it appears in Fig. 17, and the path of the web again progressively shifts toward the nozzle 98. It will accordingly be evident that, when the parts are positioned as indicated in Figures 16 and 17, the traveling web will progressively oscillate laterally with respect to the path of the web and that the reversal of the oscillations will be effected by the interruption of the air jets by the edge of the web.

It should be stated that after the actuating air pressure has been removed from the cylinder, the guide roll is readily shifted by the spring actuated plunger 54a or 54b as the case may be and thereafter there is ample friction in the guide roll supports and other shifting mechanism to maintain the guide roll in the position into which it has been placed, to counteract the slight tendency of the web to shift the axis of the cylinder.

It will also be clear that the extent of the lateral deviation of the web, that is the width of the oscillations, will be determined by the lateral spacing between the nozzles 97 and 98 and that the rapidity of the lateral deviation, that is, the period of the oscillations will depend upon the degree of the angular deflection of the guide roll as determined by the adjustment of the plungers 54a and 54b.

It should also be noted that it is not essential to the satisfactory oscillation of the web that much or any compression of the springs 56 occur in this method of oscillating the web, and for many purposes it is sufficient to engage the guide roll housing 33 with the projecting plungers; in fact, under some conditions, engagement of the housing with the plungers is not even essential, it being sufficient to successively position the guide roller in alternate tilted positions by means of the pneumatic actuating mechanism, the roll remaining in the position into which it has been placed by friction until again actuated by the piston.

*Modified form of control device*

The form of this invention illustrated in Figures 1 to 17 includes a pair of spaced control devices, one device disposed adjacent each edge of the web, comprising in effect a bilateral control in which each edge serves to actuate one of the control devices. This invention can also be embodied in a form in which the path of the traveling web is controlled from and by one edge of the web in cooperation with a suitable control device, which may be termed a unilateral control device.

Such a unilateral control device is illustrated in Figures 18 to 22 of the drawings. In reference to these figures, it is to be assumed that the traveling web 17 is mounted on a plurality of rolls including a guide roll whose axis is tiltable with respect to the axes of the other rolls and including a suitable mounting for this roll and mechanism for tilting the axis of this roll with respect to the other rolls when actuated by the control device about to be described. The parts of this apparatus may be identical with or the equivalents of the guide roll 20, shaft 28, bearing housing 33, bearing plate 35, bracket 39, lever 41, link 43, piston 44, cylinder 45, valve 48, valve actuating solenoids 59 and 60, and circuits 66 and 67 and associated mechanism, all of which has been previously described in detail.

Reference characters 66 and 67 in Figures 18, 19, 20 and 22 suggest the circuits described in connection with Figures 1 to 15 and serving, when closed, to energize the solenoids 59 and 60 respectively which in turn actuate the guide roll tilting mechanism in the manner previously described.

Figure 18:
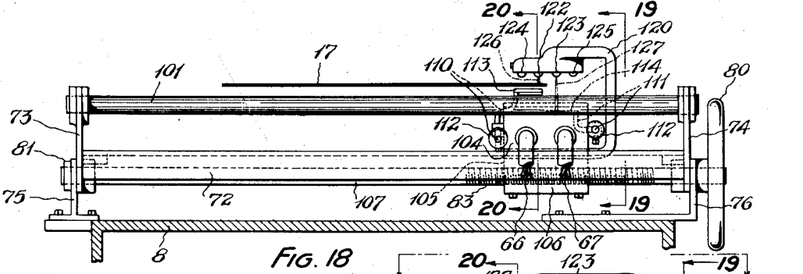
Fig. 18 is a view similar to Fig. 7 but illustrating a modified form of this invention in which the path of the traveling web is controlled by a control device actuated by one side of the belt only.
Figures 19, 20, 21, 22:
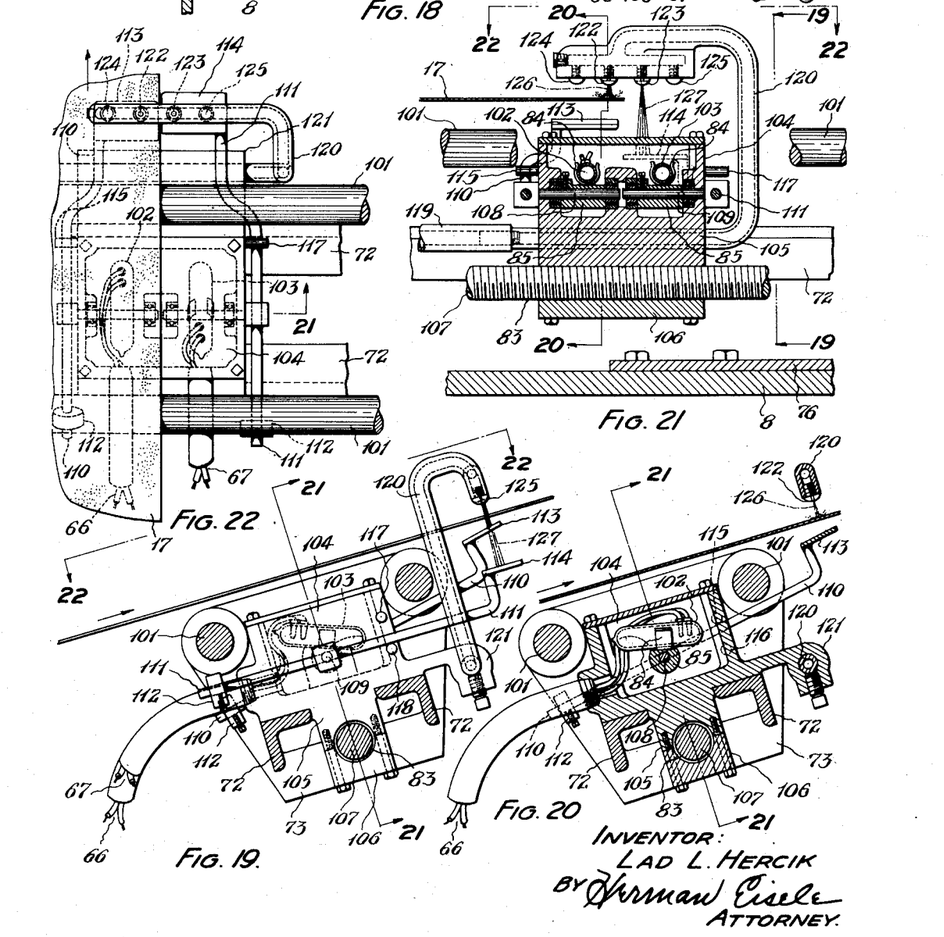
Fig. 19 is an enlarged sectional view of a portion of the parts shown in Fig. 18, this section being taken from the plane indicated by line 19, 19 in Figures 18 and 21.
Fig. 20 is another enlarged sectional view of a portion of the parts shown in Fig. 18, this section being taken on the plane indicated by line 20, 20 of Figures 18 and 21.
Fig. 21 is a transverse sectional view of the parts illustrated in Figures 18, 19 and 20 taken on the planes indicated by line 21, 21 in Figures 19 and 20.
Fig. 22 is a plan view of a portion of the parts illustrated in Figures 18 to 21, this view being taken from the plane indicated by line 22, 22 in Figures 19 and 21.

Referring now to the details of the modified form of control device, this control device is located adjacent one edge of the traveling web 17 and is preferably positioned generally symmetrically about the edge of the web as will appear best from Figures 18 and 21. This control device includes two mercury switches for controlling the circuits 66 and 67 which are indicated at 102 and 103 respectively. These mercury switches are supported in a suitable switch casing 104 and this casing is mounted for adjustment in a direction transverse to the direction of travel of the web 17 upon a pair of spaced angles 72, 72 these angles being fixed to suitable end brackets 73 and 74 which are in turn mounted in any desired manner on support members 75 and 76 fixed on the main frame 8. For the purpose of adjustment the casing 104 is formed with a downwardly extending projection 105 provided with a cap 106, the projection and the cap being formed with complementary recesses having screw threaded engagement with screw threads 83 formed on a transversely extending screw 107. This screw is supported by and extends beyond the end brackets 73, 74 and is rotatably supported by these brackets and by the members 75 and 76. At a point beyond the support member 76, a hand wheel 80 is fixed to the screw 107 and a suitable thrust collar 81 is mounted on the shaft exteriorly adjacent the support member 75.

From this description it will be evident that a rotation of the hand wheel 80 and thereby the screw 107 will serve to adjust the switch casing 104 transversely with respect to the frame of the machine.

As in the previously described form, the switch casing is formed with seats snugly slidably mounted upon and between the transverse angles 72 and the screw 107 serves to maintain this casing seated upon the angles 72.

The mercury switches 102 and 103 are each formed with two spaced contacts located at one end of the enclosing glass tube as best shown in Figures 19 and 20, these contacts maintaining the circuit open when the mercury tube is tilted to position the mercury in that end of the tube opposite to the contacts. The mounting of the mercury switch 103 is substantially identical with the mounting for switches 68 and 69; however the mounting of the switch 102 is reversed as compared with the switch 103, for a reason to be pointed out.

The mercury switch 102 is fixedly mounted on the shaft 108 by means of a spring clip 84 and collar 85 and the switch 103 is similarly mounted on the shaft 109. These shafts 108 and 109 are mounted in opposite sides of the casing 104 and are preferably axially aligned and are each supported in a pair of spaced antifriction bearings, as clearly appears from Fig. 21. Each shaft extends outwardly beyond the edge of the casing, the shaft 108 extending beyond what may be termed the outer edge of the casing, and the shaft 109 extending beyond the opposite or inner edge of the casing. Upon these extensions of the shafts 108 and 109 are mounted control levers 110 and 111 respectively, each control lever being provided with a counterweight 112 at one end as best shown in Figures 19, 20 and 22. The control levers 110 and 111 at the ends opposite the counterweight are angularly bent toward each other and are each formed at this end with relatively thin flat plates or spoons 113 and 114. These spoons are located, in the embodiment disclosed, below the plane of the traveling web 17 and are symmetrically disposed with respect to the edge of the web. The levers 110 and 111 are fixed to the shafts 108 and 109, respectively, and thus mounted for easy oscillatory movement in a vertical plane, this movement being limited however by a pair of stop pins 115 and 116 and stop pins 117 and 118 respectively (Figures 19 and 20). The counterweighting of these levers is so adjusted that, in the absence of the application of any external force, the lever occupies a position abutting the upper stop pin in each case.

A nozzle tube 120 is adjustably supported axially and angularly in a bore of a boss 121 formed on the switch casing 104. This nozzle tube is connected at one end with a preferably flexible air line 119 which may be identical with the air line 93 previously described and which may receive its supply of air in like manner.

As will best appear from Fig. 21, the nozzle tube is bent upwardly on the outer side of the switch casing 104 and then inwardly to form a substantially horizontal header portion at a position juxtaposed with the spoons 113 and 114 and symmetrical about the edge of the web 17. This header is formed with a series of threaded openings communicating with the bore of the nozzle tube 120, each of these openings being closed by a screw threaded plug as best shown in Fig. 21. Two of these plugs 122 and 123 are each formed with a relatively small axial aperture and thus constitute nozzles and the other two plugs 124 and 125, in the arrangement illustrated, are blank. The apertured plugs 122 and 123 are spaced relatively closely together and are located intermediate the plugs 124 and 125 in the arrangement illustrated. As will also be noted from the drawings, the plugs are disposed on the upper side of the plane of the traveling web, that is on the opposite side from that on which the spoons 113, 114 are located. It will also be evident that the nozzle forming plugs 122 and 123 are symmetrically spaced with respect to the edge of the web 17 and that the plugs 124 and 125 are likewise symmetrically located with reference to the same edge of the web 17.

Air under pressure is supplied from any suitable source to the nozzle tube 120 from the air line 119, causing jets 126 and 127 to issue from the plugs 122 and 123 respectively. As will appear from Figures 21 and 22, the spoon 113 on the control lever 110 is aligned with and located opposite the nozzle plugs 122 and 124 and likewise the spoon 114 on the control lever 111 is aligned with and located opposite the plugs 123 and 125. In the arrangement shown, the jet 127 issuing from the plug 123 impinges against the spoon 114 thus forcing the adjacent end of the lever 111 downwardly and causing the mercury switch 103 to maintain the circuit 67 in an open position. It will also appear that the jet 126 issuing from the nozzle 122 is blocked by the web 17 thus preventing the jet from impinging against the spoon 113 on the lever 110. This lever is accordingly tilted upwardly, by the counterweight 112, into the position shown in Fig. 20 causing the switch 102 to maintain the circuit 66 in the open position.

In the position in which the parts are shown in Figures 18 to 22 of the drawings, the web 17 is assumed to be running in a predetermined fixed path and the air jets 126, 127 are coacting in such manner with the control levers 110, 111 as to keep the electrical circuits 66 and 67 open and the solenoids 59 and 60 de-energized, as a result of which the pneumatically actuatable guide roll tilting mechanism is inactive and the guide roll is in its normal position, substantially parallel to the other web supporting rolls, tending to keep the belt traveling in its predetermined path.

In the event, however, that the web 17 meanders from the desired fixed path, the effect of the altered position of the edge portion of the web is to cause the control device to energize one or the other of the circuits 66 or 67, causing the guide roll tilting mechanism to be actuated in the appropriate corrective direction, to return the web to the desired path. If it be assumed, for instance, that the web shifts to the right in Figures 18, 21 and 22, this shifting will eventually block the jet 127, permitting the spoon end of the control lever 111 to tilt upwardly against the stop pin 117 under the influence of its counterweight 112. This tilting action causes the mercury switch 103 to close the circuit 67 as will be understood from Fig. 19, thus energizing the solenoid 60 to actuate the guide roll tilting mechanism in the proper direction to guide the path of the web to the left.

If it be assumed, on the other hand, that the web meanders to the left, as viewed in Figures 18, 21, and 22, this lateral shifting will eventually unblock the jet 126, permitting the jet to impinge against the spoon 113 of the control lever 110, forcing the spoon end of this lever to tilt downwardly against the stop pin 116 overcoming the counterbalancing effect of its counterweight 112. This tilting action causes the mercury switch 102 to close the circuit 66 as will appear from Fig. 20, thus energizing the solenoid 59 to actuate the guide roll tilting mechanism in a direction to shift the path of the web to the right.

It will appear that in the above described unilateral control device one jet is totally blocked by the web when the web is traveling in its normal path that this jet is unblocked during certain deviations of the web from the normal path. It will also appear that the other jet in this control device is unblocked by the web when the web is in its normal path and that this other jet is blocked during certain deviations of the web from its normal path.

This modified control device, as in the case of the devices illustrated in Figures 1 to 17, is also adapted to cause a traveling web to oscillate or shift in a controlled manner from a median path. In order to arrange this control device so that it will be adapted for oscillating the web it is only necessary to interchange the apertured plug 123 and the blank plug 125 or to interchange the apertured plug 122 and the blank plug 124 or to interchange both sets of plugs. This will space the apertured plugs and hence the jets 126 and 127 farther apart permitting the web to shift laterally a greater distance as will be evident. If now the plungers 54a and 54b are set so that the guide roll will normally remain out of parallelism with the other rolls, alternately in opposite directions, as pointed out in connection with the description of Figures 16 and 17, then the path of the web will be caused to shift progressively and alternately from side to side, as the web blocks the jet 127 on the one hand and unblocks the jet 126 on the other hand.

It will be evident that the unilateral control device just described is of compact construction and is adapted to perform all of the functions effected by the previously described spaced devices.

*Additional modifications*

It will be understood that various alterations, modifications and/or additions may be made in the apparatus shown or in the methods described, without departing from the scope of this invention as defined by the appended claims.

In this respect it is to be particularly noted that air is not the only medium which can be used for the jets, and other gases or steam may be substituted for air in case, for instance, that this apparatus is used to control the path of a strip thru an annealing furnace where a reducing atmosphere is essential and where air is objectionable. In some applications, also, a stream of water or other liquid may advantageously be substituted for the jet of air without departing from the scope of this invention, as for instance, in guiding a strip immersed in liquid. For this reason the term "fluid" is used in the claims which is intended to comprehend any gas or liquid, and this term is used interchangeably with the term "air" or "pneumatic." No limitations should be implied from the use of any of these terms, however, and all of the claims are believed to be entitled to an interpretation broad enough to cover the use of any gas or liquid, which is clearly contemplated by the applicant and well within the scope of the invention.

Numerous mechanical modifications may be made. For instance, instead of positioning one jet and jet responsive control device beyond each edge of the web, as shown in Figures 1 to 17, whereby the jets are normally unblocked, it would be possible to position one jet and jet responsive control device inwardly of each edge of the web, as is taught by the disclosure of Figures 18 to 22 in which the jet 126 is normally located inwardly from the edge of the web and is blocked by the web and in which an unblocking of the jet causes a corresponding correction deviation of the web.

It will also appear that suitable springs may be substituted for the counterweights 88 and 112, associated with the control levers 87 and 110, 111 respectively.

Likewise many changes may be made in the detail construction of the unilateral control device, such as the substitution of two individual adjacently disposed casings for the double casing 104 and the substitution of individual nozzle tubes and nozzles for the composite nozzle 120.

It will likewise be evident that while the control device including the nozzles, control levers, switch means and casing is preferably positioned adjacent the guide roll, this control device may be placed in any convenient position where the edge or edges of the web are accessible. It is also evident that the control device need not be positioned adjacent a substantially horizontal portion of the belt and that this device may readily be adapted to function at any angle and even in a position inverted from that shown in the drawings, by minor rearrangements of the control levers and counterweights.

It will also be evident that it is not necessary that a special guide roll be provided and that any of the rolls which support the web may be manipulated to correctively guide the deviated web to its predetermined path or to cause the web to oscillate.

While the tilting of the guide roll 20 is shown as being substantially parallel to the path of the traveling web, it is evident that this roll may be tilted at any desired angle to insure the required corrective lateral shifting of the web.

It will further be evident that the shifting mechanism is not limited to that shown and that any suitable mechanism may be used and that the source of power need not be pneumatic but that hydraulic, spring, weight or any other convenient source of power may be used for this purpose.

Many other modifications of this invention and its application will naturally occur to those skilled in this art and the present disclosures should therefore be considered as typical only, and I desire not to be limited to the exact constructions shown and described.

It is to be noted that certain features disclosed in this application and not claimed herein, are claimed in my copending application Serial No. 338,175, filed May 31, 1940.

What I claim is:

1. In apparatus for controlling traveling webs subject to lateral deviations from a desired normal path, mechanism adapted, when actuated, to correctively guide the web to the desired path, a control device adapted to actuate the mechanism and including a relatively light tiltably mounted wing yieldingly held in one of two terminal tilted positions, a source of air under pressure producing a needle air jet adapted when impinging against the wing to tilt the wing to the other of the two terminal positions, said source and said wing being disposed adjacent one edge of the web on opposite sides of the plane of the web and spaced from the web, said jet being intercepted by the web when the web deviates from the normal path and said device being actuated only during the interception of the jet and causing a corrective deviation of the web and a consequent discontinuance of said jet interception.

2. In apparatus for controlling traveling webs subject to lateral deviations from a desired normal path, the combination of mechanism adapted, when actuated, to correctively guide the web to the desired path, a source of air under pressure, a relatively fine aperture communicating with the source for discharging a needle jet of air, a tiltable wing mounted to be tilted when impinged by the jet and including electrical means for actuating the mechanism when tilted, the wing and the aperture each being spaced from the plane of the web and being so associated with respect to each other and with respect to the edge of the web that the jet will variously actuate the wing in accordance with variations in the lateral deviations of the web.

3. In apparatus for controlling a traveling web subject to lateral deviations, the combination of mechanism adapted when actuated to shift the web laterally, means providing a jet of air under pressure, a control device having an element movable between limits and adapted to actuate said shifting mechanism, the device and the jet being so associated with respect to each other and with respect to the web that the jet will directly impinge on the movable element to move the same by its kinetic energy or will be intercepted, depending on variations in the lateral deviations of the web, and means biasing the movable element to move from one of its limits toward the other responsive to variations in the force of said impingement.

4. In apparatus for controlling a traveling web subject to lateral deviations, the combination of mechanism adapted when actuated to shift the web laterally, means providing a jet of air under pressure, a control device having an element movable between limits and adapted to actuate said shifting mechanism, the device and the jet being so associated with respect to each other and with respect to the web that the jet will directly impinge on the movable element to move the same by its kinetic energy when the web is in normal position and will be intercepted by the web when the web has deviated laterally a predetermined extent from said normal position, and means biasing the movable element to move from one of its limits toward the other responsive to variations in the force of said impingement.

5. In apparatus for controlling traveling webs subject to lateral deviations from a desired predetermined path, the combination of mechanism adapted, when actuated, to correctively guide the web to the predetermined path and including an electro-magnetic element, a control device adapted to actuate the mechanism and including a relatively light, tiltably mounted wing yieldably held in one of two terminal positions, an electric switch associated with the wing adapted to control the electro-magnetic element, and means providing a needle air jet adapted when impinged against the wing to tilt the wing into the other of the two terminal positions, the said jet and wing being so associated with respect to each other and with respect to the edge of the web that the jet will variously actuate said wing in accordance with variations in the lateral deviations of the web.

6. In apparatus for controlling traveling webs subject to lateral deviations from a desired normal path, a pair of nozzles each adapted to deliver a jet of air, the first nozzle being so disposed relatively to the web in its normal path that its jet is blocked by the web and the other nozzle being disposed with respect to the web in its normal path that its jet is unblocked by the web, an air jet responsive control device associated with each of the nozzles, said devices each being adapted to correctively control the path of the web in one lateral direction, the device associated with the first nozzle being adapted to actuate the device when the jet is unblocked and the second nozzle being adapted to actuate the device when the jet is blocked.

7. In apparatus for controlling traveling webs subject to lateral deviations from a desired normal path, mechanism adapted when actuated to correctively shift the web to the desired path, a pair of nozzles delivering air jets disposed adjacent one edge of the traveling web, an air jet responsive control device associated with each of the nozzles, the nozzles and devices being so disposed with respect to the said edge of the normally traveling web that the jet issuing from the first nozzle is blocked from reaching the first device and the jet issuing from the second nozzle is free to reach the second device, the first device being adapted to actuate the said mechanism only when the jet is unblocked and the second device being adapted to actuate the said mechanism only when the jet is blocked.

8. In apparatus for controlling traveling webs subject to lateral deviation in both directions from a normal path, a plurality of rolls for supporting and causing the web to travel in a given direction, one of said rolls being angularly tiltable in two directions from its normal position with respect to said other rolls thereby to correctively guide the traveling web to its normal path, mechanism adapted to tilt the said roll, control devices responsive to deviations from the normal path of travel of the web adapted to actuate said mechanism to correctively tilt the said roll, and means independent of the tilting mechanism adapted to automatically return the tiltable roll to its normal position from either direction of tilt, when the lateral deviation of the web has been corrected.

9. In apparatus for controlling traveling webs subject to lateral deviation in both directions from a normal path, a plurality of rolls for supporting and causing the web to travel in a given direction, one of said rolls being angularly tiltable with respect to the other rolls to laterally shift the path of the web, screw means for adjusting the axis of the tiltable roll to cause the web to travel in the normal path, mechanism adapted to tilt the axis of said tiltable roll from the adjusted position, control devices responsive to deviations from the normal path of travel of the web adapted to actuate said mechanism to correctively tilt the roll from the adjusted position and means adapted to automatically return the tiltable roll to its adjusted position when the said control devices have ceased to actuate said mechanism.

10. In apparatus for controlling traveling webs subject to lateral deviation in both directions from a normal path, a plurality of rolls for supporting and causing the web to travel in a given direction, one of said rolls being angularly tiltable with respect to said other rolls to correctively shift the web to its normal path, screw means for adjusting the axis of the tiltable roll to cause the web to travel in a desired path, mechanism including a fluid cylinder adapted to positively tilt the axis of said tiltable roll from the adjusted position, control devices including a fluid jet responsive to deviations from the normal path of travel of the web adapted to actuate said mechanism to correctively tilt the roll, and resilient means adapted to automatically return the tiltable roll to its adjusted position when the said control devices have ceased to actuate said mechanism.

11. In apparatus for controlling traveling webs subject to lateral deviation in both directions from a desired path, a plurality of rolls for supporting and causing the web to travel in a given direction, one of said rolls being angularly tiltable with respect to the other rolls to laterally shift the path of the web, screw means for adjusting the axis of the tiltable roll to cause the web to travel in the desired path, mechanism adapted to tilt the axis of said tiltable roll with respect to the other rolls thereby to correctively guide the web to its desired path, control devices responsive to deviations from the desired path of travel of the web adapted to intermittently actuate said mechanism to correctively tilt the roll, spring means adapted to automatically return the tiltable roll to its adjusted position when the said control devices have ceased to actuate said mechanism and means to limit the action of the spring means on the roll.

12. In apparatus for controlling traveling webs subject to lateral deviation in both directions from a normal path, a plurality of rolls for supporting and causing the web to travel in a given direction, one of said rolls being angularly tiltable with respect to the other rolls to laterally shift the path of the web, at least one end of said tiltable roll being supported in a bearing movable transversely of the axis of the tiltable roll, mechanism adapted to move said bearing, control devices responsive to deviations from the normal path of travel of the web adapted to intermittently actuate said mechanism to move the bearing whereby the roll is tilted to correctively shift the travel of the web to its normal path, automatic means for moving the bearing to its original position when the actuation of the mechanism is terminated and stops to limit the extent to which the automatic means moves the bearing.

13. In apparatus for laterally oscillating a traveling web from a median path including in combination a plurality of rolls for supporting and causing the web to travel in a given direction, mechanism adapted when alternatively actuated to angularly tilt one of said rolls with respect to the other rolls to cause the web to deviate from the median path alternatively in opposite directions, adjustable means for limiting the degree of angular tilt imparted to the tiltable roll whereby the speed of deviation of the web is regulated, and control means responsive to the positions of at least one edge of the web adapted to actuate the mechanism to alternately tilt the roll in opposite directions, the control means being adjustable relatively to the edge of the web, whereby the extent of lateral deviation may be fixed.

14. In apparatus for causing lateral deviation of a traveling web from a median path including in combination a plurality of rolls for supporting and causing the web to travel in a given direction, means permitting the angular tilting of one of said rolls with respect to the other rolls, said means including a shiftable bearing housing, a pair of stops disposed on opposite sides of the housing and adapted to limit the shift of the housing, the stops and housing being so disposed that the roll is tilted in alternate directions from parallelism with the other rolls when the housing engages alternate stops, mechanism adapted when actuated to shift the housing successively against alternate stops and control means responsive to the web in its positions of maximum deviation for actuating the mechanism.

15. In apparatus for laterally oscillating a traveling web from a median path including in combination a plurality of rolls for supporting and causing the web to travel in a given direction, mechanism adapted when alternatively actuated to angularly tilt one of said rolls with respect to the other rolls in opposite directions from a median position, control means responsive to the positions of at least one edge of the traveling web adapted to actuate the mechanism to alternately tilt the roll in opposite directions, and mechanism for automatically returning the roll from the said tilted positions to positions toward but short of the median position.

16. In apparatus for laterally oscillating a traveling web from a median path including in combination a plurality of rolls for supporting and causing the web to travel in a given direction, mechanism adapted when alternatively actuated to angularly tilt one of said rolls with respect to the other rolls in opposite directions from a median position, control means responsive to the positions of at least one edge of the traveling web adapted to actuate the mechanism to alternately tilt the roll, and mechanism for automatically returning the roll from the said tilted position toward said median position, and adjustable means for varying the extent of the return tilt of the guide roll when the control means ceases to actuate the tilting mechanism.

L. L. HERCIK.